(12) United States Patent
Annerino et al.

(10) Patent No.: US 7,077,594 B1
(45) Date of Patent: Jul. 18, 2006

(54) EXPANDABLE AND CONTRACTIBLE STYLUS

(75) Inventors: Frank Annerino, Rolling Meadows, IL (US); Michael Albertini, La Grange, IL (US); John Byrne, Lake Villa, IL (US); Joel Friedrick, Crystal Lake, IL (US)

(73) Assignee: Palm, Incorporated, Sunnyvale, CA (US)

( * ) Notice: Subject to any disclaimer, the term of this patent is extended or adjusted under 35 U.S.C. 154(b) by 0 days.

(21) Appl. No.: 10/374,958

(22) Filed: Feb. 25, 2003

(51) Int. Cl.
*B43K 1/10* (2006.01)
*B43K 29/00* (2006.01)
*A46B 11/00* (2006.01)
*A45C 13/22* (2006.01)

(52) U.S. Cl. .................. 401/258; 401/195; 401/48; 16/429; 16/427

(58) Field of Classification Search ............... 401/109, 401/110, 111, 112, 258, 259, 260, 48, 195; 16/427, 429; 200/523, 526, 527, 528
See application file for complete search history.

(56) References Cited

U.S. PATENT DOCUMENTS

| | | | | | |
|---|---|---|---|---|---|
| 2,865,331 A | * | 12/1958 | Marcotte | .................... | 401/111 |
| 3,419,336 A | * | 12/1968 | Kirk | ......................... | 401/111 |
| 3,819,282 A | * | 6/1974 | Schultz | ...................... | 401/105 |

* cited by examiner

*Primary Examiner*—David J. Walczak

(57) ABSTRACT

An expandable and contractible stylus for interfacing with a touchscreen of an electronic device. The expandable and contractible feature allows for a stylus that contracts to fit into a stylus holder in a small handheld device and expands to facilitate its removal from a device and to fit more comfortably in a user's hand. It holds either its expanded or contracted position for any orientation in space. An expandable and contractible stylus can facilitate the user's experience and thus provide an advantage over the other conventional styluses.

34 Claims, 17 Drawing Sheets

100b

230

400b

600

```
BEGIN
  ↓
STYLUS IS IN EXTENDED POSITION WITH RAISED FEATURE OF INDEXER AT
TOP OF CHANNEL IN OUTER SHAFT
610
  ↓
USER PRESSES DOWN ON QUILL AND INDEXER AND RAISED FEATURE SLIDE
DOWN CHANNEL
620
  ↓
RAISED FEATURE OF INDEXER CONTACTS WEDGE AND ROTATES
630
  ↓
USER RELEASES QUILL AND SPRING PRESSURE CAUSES RAISED FEATURE OF
INDEXER TO ROTATE INTO WEDGE-SHAPED GROOVE AT BASE OF INNER
SHAFT, LOCKING IT INTO THE COMPRESSED POSITION
640
  ↓
USER PRESSES DOWN ON QUILL AGAIN AND INDEXER ROTATES RAISED
FEATURE INTO NEXT POSITION
650
  ↓
USER RELEASES QUILL AND SPRING PRESSURE CAUSES RAISED FEATURE OF
INDEXER TO ROTATE INTO NEXT CHANNEL IN OUTER SHAFT AND EXPAND,
LOCKING IT INTO THE EXTENDED POSITION
660
  ↓
END
```

```
                    ┌─────────┐
                    │  BEGIN  │
                    └─────────┘
                         │
                         ▼
┌─────────────────────────────────────────────────────────────────┐
│  BEGINNING WITH STYLUS IN EXTENDED POSITION, TO ACTUATE TO      │
│  COMPRESSED POSITION, USER EXERTS DOWNWARD AXIAL FORCE ON QUILL │
│         THAT CREATES AN AXIAL FORCE ON INDEXER                  │
│                           1010                                  │
└─────────────────────────────────────────────────────────────────┘
                         │
                         ▼
┌─────────────────────────────────────────────────────────────────┐
│ INDEXER CONTACTS SURFACE OF WEDGE AND SURFACE INTERFACE CONVERTS│
│ SOME OF THE AXIAL FORCE TO A TORQUE ON THE WEDGE THAT IS OPPOSED│
│                  BY A CHANNEL IN OUTER SHAFT                    │
│                            1020                                 │
└─────────────────────────────────────────────────────────────────┘
                         │
                         ▼
┌─────────────────────────────────────────────────────────────────┐
│  WEDGE REACHES END OF CHANNEL IN OUTER SHAFT AND, UNDER FORCE OF│
│  INDEXER AND MAIN SPRING, ROTATES INTO NEXT (COMPRESSED) POSITION│
│                            1030                                 │
└─────────────────────────────────────────────────────────────────┘
                         │
                         ▼
┌─────────────────────────────────────────────────────────────────┐
│    USER RELEASES FORCE FROM QUILL AND MAIN SPRING PUSHES WEDGE  │
│  WHICH SLIDES ALONG WEDGE-SHAPED FEATURE AT BOTTOM OF OUTER SHAFT│
│               UNTIL IT LOCKS INTO COMPRESSED POSITION           │
│                            1040                                 │
└─────────────────────────────────────────────────────────────────┘
                         │
                         ▼
┌─────────────────────────────────────────────────────────────────┐
│ TO ACTUATE TO EXTENDED POSITION, USER APPLIES FORCE TO QUILL UNTIL│
│  WEDGE CLEARS ACTUATION POINT AT TIP OF WEDGE SHAPED FEATURE AT │
│                      BOTTOM OF OUTER SHAFT                      │
│                            1050                                 │
└─────────────────────────────────────────────────────────────────┘
                         │
                         ▼
┌─────────────────────────────────────────────────────────────────┐
│   UNDER FORCE OF INDEXER AND MAIN SPRING. THE WEDGE ROTATES INTO│
│   NEXT CHANNEL IN OUTER SHAFT AND EXPANDS TO EXTENDED POSITION  │
│                            1060                                 │
└─────────────────────────────────────────────────────────────────┘
                         │
                         ▼
                    ┌─────────┐
                    │   END   │
                    └─────────┘
```

FIGURE 10

EXPANDABLE AND CONTRACTIBLE STYLUS

BACKGROUND OF THE INVENTION

1. Field of the Invention

The present invention relates to the field of styluses. Specifically, the present invention relates to a stylus that can be expanded and contracted to fit, respectively, in the hand of a user and in a stylus holder of a small electronic device.

2. Related Art

A stylus was originally an instrument used by the ancients for writing in clay or wax. Today it is a pointed device that may be used with a touch screen or a digitizing tablet. There are numerous electronic devices that are equipped with touch screens as an interface mechanism. Among these devices are personal computers, both desktop and laptop styles, and handheld devices such as electronic game devices and personal digital assistants (PDAs).

There are numerous versions of styluses available today. There are conventional styluses that resemble pens. FIGS. 1A and 1B illustrate versions of such styluses, 100a and 100b. Stylus 100a may be molded from a plastic type material and configured to fit in the stylus holder of a specific handheld device or it may be milled from any solid material such as wood, metal or a synthetic material lending itself to milling. Stylus 100b of FIG. 1B may be formed from a metal such as stainless steel, with a molded plastic or nylon tip and cap configured for holding it in the stylus holder of a handheld device.

A user of either stylus 100a or 100b may find the stylus comfortable to use if it is of a sufficient length to fit between the thumb and forefinger and rest against the base of the thumb. However, styluses are typically stored inside the devices with which they are used, thus restricting their length to the length of the device. With the increasingly smaller designs that are evolving in the world of PDAs and other handheld devices, a stylus that would not protrude beyond the end of a small device may be too short to be comfortable in a user's hand. Also, there is a need for a convenient method of extracting a stylus from a device in which it is stored.

One prior art solution is the duplication of a ballpoint pen mechanism. Another prior art solution is a pull-to-detent type of expandable stylus. These solutions have problems such as having too large a diameter to fit into a holder in the device, requiring two hands to extend, and difficulty in removing from the device. The solution using a ballpoint pen mechanism suffers because it does not remain in a contracted position when turned upside down.

There are many other conventional versions of styluses available. There are styluses that are molded into pen caps. These styluses have the disadvantage of not fitting into the device for which they are to be used. Therefore, they are susceptible to being misplaced or left behind and, therefore, may not always be readily available when needed.

In summary, the evolution of handheld electronic devices is such that they are becoming increasingly smaller and the conventional styluses that fit in a stylus holder in today's smaller device are too short to fit comfortably in an average user's hand. A solution to this problem would be advantageous. The present invention, in various embodiments, provides such a solution.

SUMMARY OF THE INVENTION

The present invention provides an expandable and contractible stylus for interfacing with a touchscreen of an electronic device. The present invention allows for a stylus that contracts to fit into a stylus holder in a small handheld device and expands to facilitate its removal from a device and to fit more comfortably in a user's hand. It holds either its expanded or contracted position for any orientation in space. An expandable and contractible stylus may facilitate the user's experience and thus provide an advantage over other conventional styluses.

In one embodiment, the present invention is implemented as a stylus comprised of a tube with a tip and tip housing coupled to one end, a slideable shaft within the tube, and a plunger coupled to the shaft. In response to depressing the plunger a first time, the shaft moves from a first position to a second position and remains in the second position for any orientation in space. In response to depressing the plunger a second time, the shaft moves from the second position back to the first position and remains in the first position for any orientation in space.

In one embodiment, the stylus further comprises a wedge coupled to the shaft and a rotating indexer coupled to the shaft. The indexer has a raised feature and the indexer is configured to interface with the wedge so as to rotate when the plunger is depressed. The stylus also has a spring contacting the shaft so as to exert a force for locking the raised feature of the indexer and maintaining the shaft in a contracted position. In one embodiment, in the contracted position the stylus fits into a custom stylus holder within a handheld electronic device.

In addition to the above, according to one embodiment, the stylus has an outer shaft disposed within the tube and coupled to the shaft. The outer shaft has an inside channel. The raised feature of the indexer is configured to slide into the inside channel when aligned with the channel and acted on by the force from the spring. The force then maintains the shaft in an expanded position. In one embodiment, depressing the plunger while the stylus resides in the holder of a handheld electronic device causes the stylus to expand, thus facilitating removal of the stylus from the device.

In one embodiment, the indexer is retained on the shaft by a retaining ring. In another embodiment, the indexer is retained on the shaft by a retaining screw.

According to one embodiment, the tip of the stylus is a pen point with ink cartridge that is configured to emerge from the tip housing when the shaft is in the contracted position.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

FIG. 6 is a flow diagram showing a process for expanding and contracting a stylus according to one embodiment of the present invention.

FIG. 10 is a flow diagram showing a process for expanding and contracting a stylus according to one embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Figure 1A:
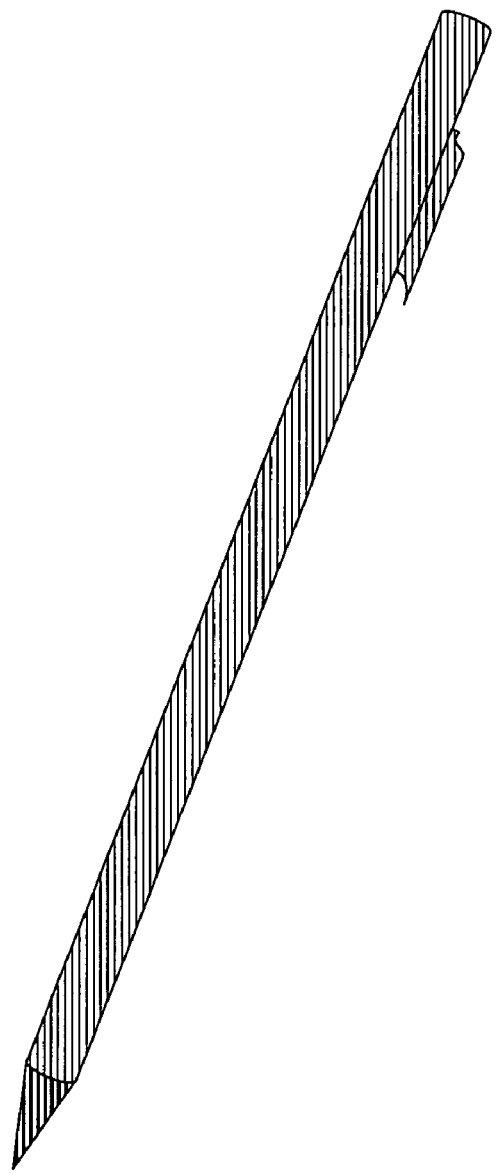
FIG. 1A illustrates a solid stylus in accordance with one embodiment of the prior art.
Figure 1B:
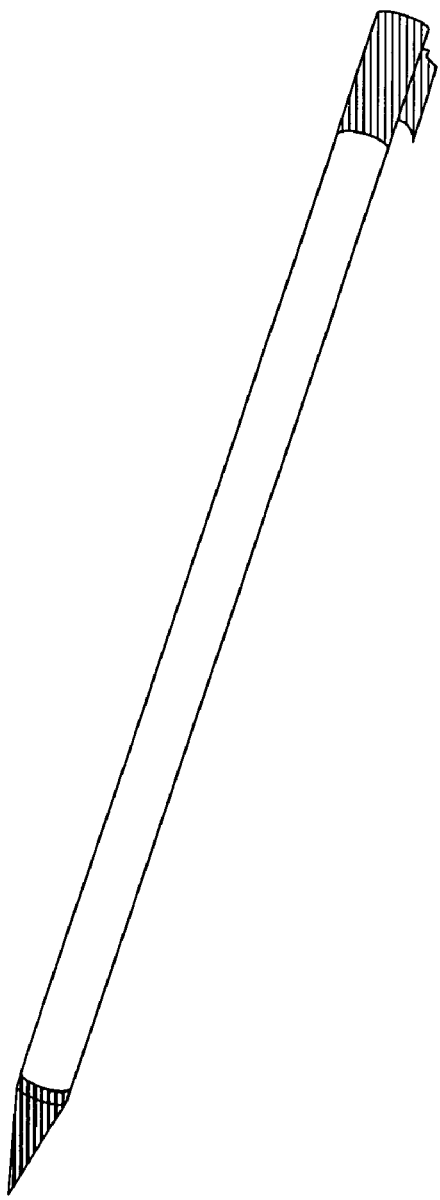
FIG. 1B illustrates a solid stylus in accordance with one prior art embodiment.
Figure 2A:
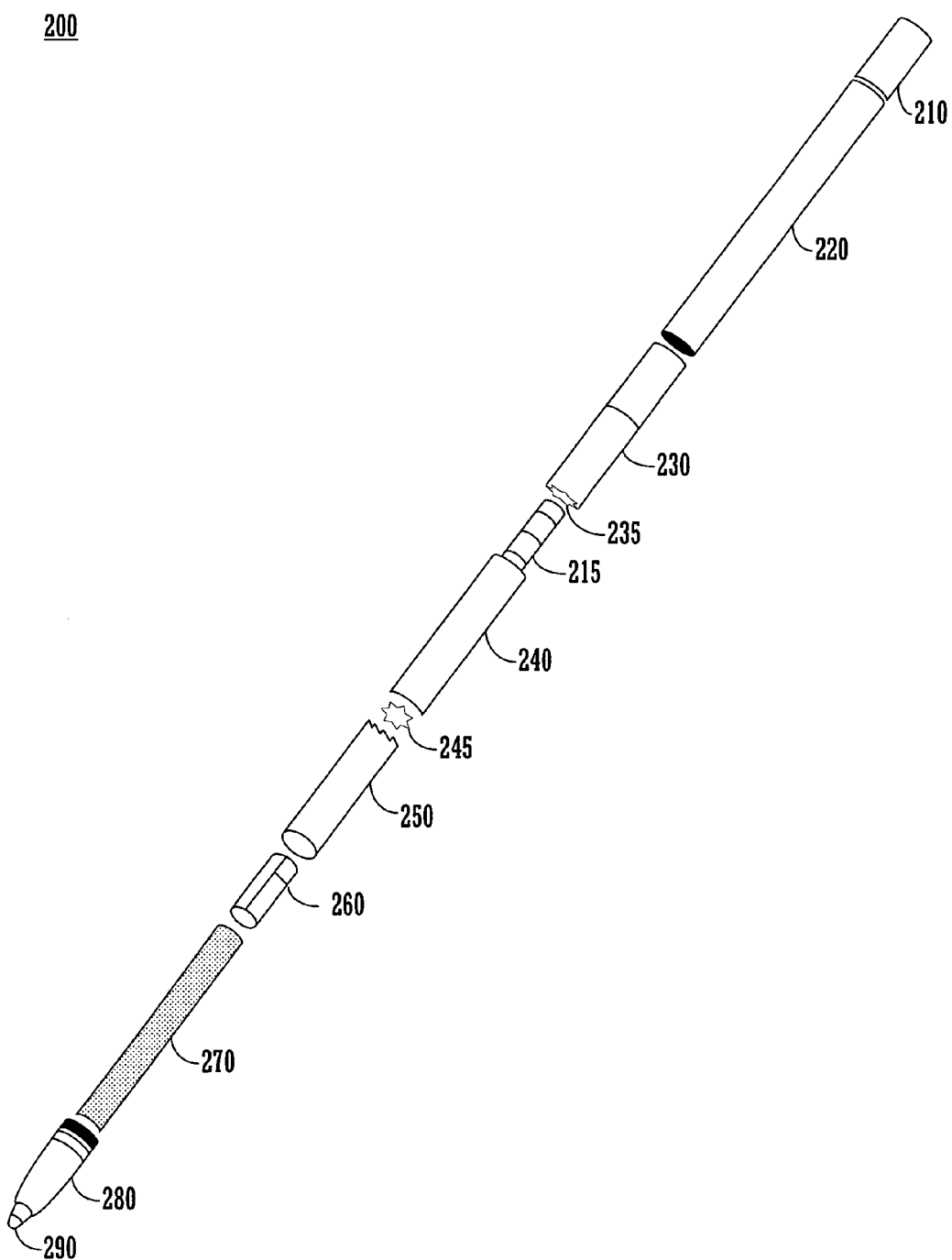
FIG. 2A is an exploded view of an expandable and contractible stylus in accordance with one embodiment of the present invention.

FIG. 2A is an exploded view of expandable and contractible stylus 200 in accordance with one embodiment of the present invention. Plunger (or quill) 210 may be constructed of a molded plastic or a metal or any material that would be appropriate for affixing to a shaft. In one embodiment, plunger 210 is pressed onto boss 215 on the end of inner shaft 240 or, in another embodiment, plunger 210 may be threaded and screwed onto boss 215.

Outer tube 220 is the main body of stylus 200 according to one embodiment. Outer tube 220 can be machined from a metal such as stainless steel, or outer tube 220 can be molded from a synthetic material such as plastic or nylon. It should be appreciated that outer tube 220 can be constructed of any material that lends itself to forming a tube of appropriate size and shape for stylus 200. Outer tube 220, according to one embodiment, has a threaded end for receiving removable tip housing 280. In another embodiment, tip housing 280 is swaged onto outer tube 220. In one embodiment, tip housing 280 is molded or milled as an integral part of outer tube 220.

Figure 2B:
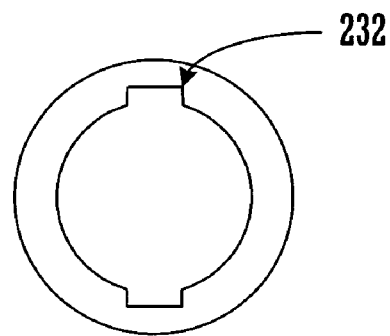
FIG. 2B is a cross-sectional view of an outer shaft of an expandable and contractible stylus according to one embodiment of the present invention.
Figure 3:
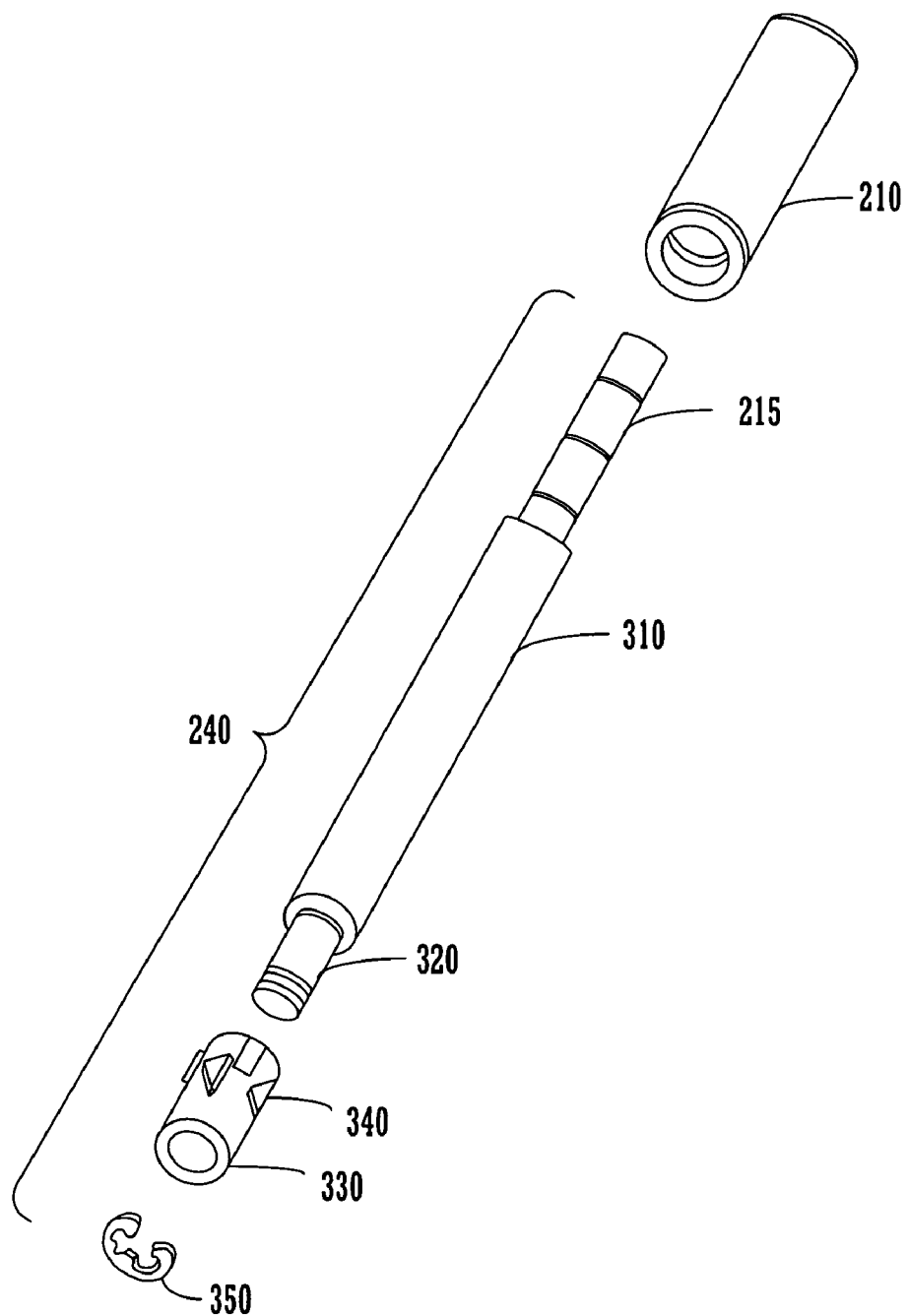
FIG. 3 is an exploded view of an innershaft and plunger of an expandable and contractible stylus according to one embodiment of the present invention.

Still referring to FIG. 2A, in the present embodiment, outer shaft 230 is a tube that is disposed within outer tube 220 and fits over an inner shaft 240. Outer shaft 230 contains channels 232, as shown in FIG. 2B. A feature on an indexer (e.g., feature 340 of indexer 245 as shown in FIG. 3) may move inside channels 232 to achieve an expanded position of stylus 200. The end of outer shaft 230 that houses the opening to the channels 232 has wedge-shaped features 235 that work in concert with a spring 270 and a wedge 250 for locking stylus 200 into a contracted position, according to one embodiment of the present invention.

Inner shaft 240 of stylus 200, shown in detail in FIG. 3, houses rotating indexer 245 that, in concert with the outer shaft 230, spring 270 and wedge 250, functions to cause stylus 200 to expand and contract, according to one embodiment.

In the present embodiment, wedge 250 is a tube that houses spacer 260 and spring 270, and has wedge-shaped edges that work in concert with the force of spring 270, outer shaft 230 and rotating indexer 245 to expand and contract stylus 200, as shown in FIGS. 4A, 4B, 4C and 5.

Spacer 260 of stylus 200 in FIG. 2A functions, in one embodiment, to hold spring 270 away from the wedge end of wedge 250 and to reduce the length of spring 270 needed to exert sufficient force for locking indexer 245 into position.

In one embodiment of the present invention, spring 270 exerts a force that locks a protruding feature on indexer 245 into a position with respect to outer shaft 230 so as to maintain stylus 200 in an expanded or contracted position.

In the present embodiment, tip housing 280 contains tip 290, a smooth surface that functions to contact a touchscreen or digitizing tablet of a handheld device for the purpose of interfacing with the device. Tip housing 280 may also house a pen tip with ink cartridge that may allow stylus 200 to alternate between stylus function and pen function.

FIG. 2B is a cross-sectional view of outer shaft 230 of expandable and contractible stylus 200, according to one embodiment of the present invention. Channels 232 are designed to accept a raised feature on indexer 245, allowing the feature to slide so as to move innershaft 240 to an expanded position.

FIG. 3 is an exploded view 300 of an inner shaft 240 and plunger 210 of expandable and contractible stylus 200, according to one embodiment of the present invention. Plunger-type quill 210 fits onto boss 215 of inner shaft 240. Quill 210 is joined to boss 215 by a force fit, according to one embodiment.

According to another embodiment, quill 210 and boss are threaded so that quill 210 screws onto boss 215.

Inner shaft 240 has a main body 310 and a lower boss 320 onto which indexer 330 fits in accordance with one embodiment of the present invention. Indexer 330 is held on lower boss 320 by a retaining device 350. In one embodiment, the retaining device is a retaining ring. In another embodiment, the retaining device is a retaining screw. Indexer 330 rotates freely around lower boss 320 when retaining device 350 is in place.

Still referring to FIG. 3, indexer 330 has a number of evenly spaced raised features 340 that are designed, according to one embodiment, to slide into channels inside an outer shaft 230 when the indexer 330 is positioned for expanding stylus 200. Raised features 340 are designed to be captured by a wedge feature 235 of the outer shaft when in a contracted position, according to one embodiment. In one embodiment, raised features 340 are triangular in shape. These features may, however, be of any design that would slide into channels in outer shaft for expanding a stylus and be captured by features in a wedge when the stylus is contracted.

Figure 4A:
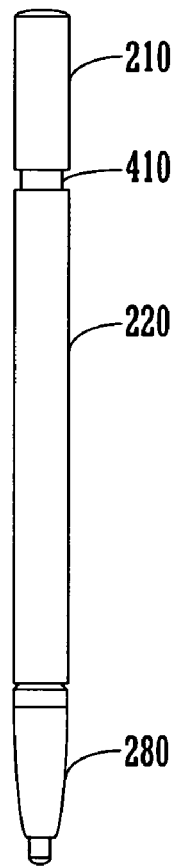
FIG. 4A illustrates an expandable and contractible stylus in a contracted position, according to one embodiment of the present invention.

FIG. 4A illustrates an expandable and contractible stylus in a locked, contracted position 400a, according to one embodiment of the present invention. A portion 410 of inner shaft 240 is seen between quill 210 and outer tube 220 when stylus 200 is in the contracted position. In this contracted position 400a, stylus 200 is designed to be stowed in a holder portion of a device with which it is to be used.

Figure 4B:
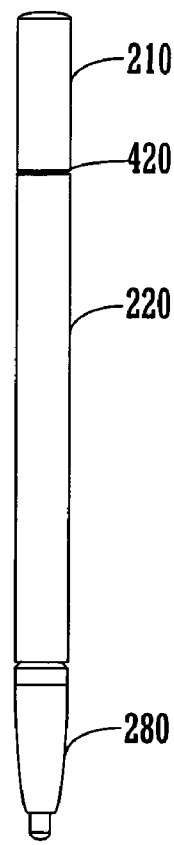
FIG. 4B is an illustration of an expandable and contractible stylus in a depressed position, according to one embodiment of the present invention.

FIG. 4B is an illustration of an expandable and contractible stylus in a depressed position 400b, according to one embodiment of the present invention. In this position, a user is pressing on quill 220 and no part of inner shaft 240 is visible at location 420. Indexer 330 has been rotated to a next position (see FIG. 5) so that, upon releasing, if the stylus had been in a contracted position, it will expand or, having been in an expanded position, it will assume a contracted position.

Figure 4C:
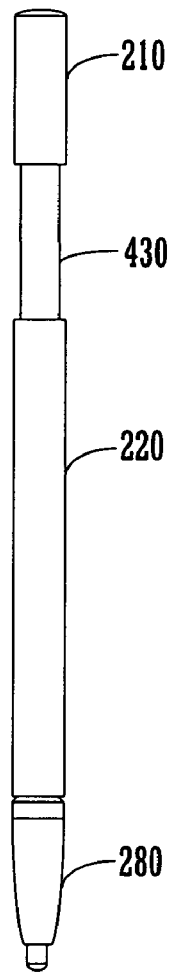
FIG. 4C is an illustration of an expandable and contractible stylus in an expanded position, according to one embodiment of the present invention.

FIG. 4C is an illustration of an expandable and contractible stylus in an expanded position 400c, according to one embodiment of the present invention. Note that a portion 430 of the body 310 of inner shaft 240 is visible in expanded position 400c. In position 400c stylus 200 is elongated to fit more comfortably in the hand of a user. In one embodiment, if a user depresses quill 210 while stylus 200 is contracted and residing in a device holder, stylus 200 expands to position 400c for easy extraction from the device.

Figure 5:
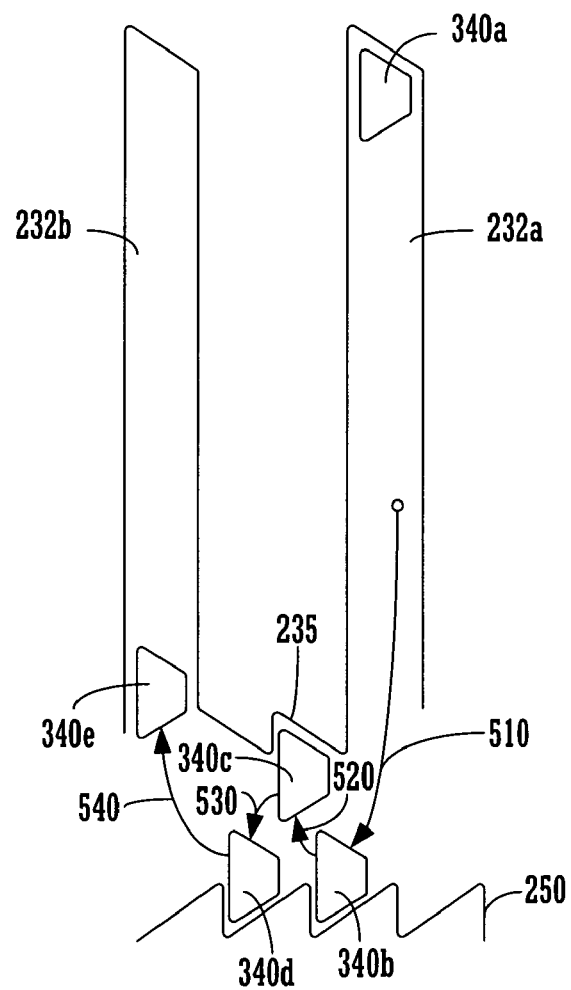
FIG. 5 illustrates the rotating indexer and wedge of an expandable and contractible stylus, according to one embodiment of the present invention.

FIG. 5 illustrates the operation 500 of the protruding feature 340 of rotating indexer 330 and wedge 250 of expandable and contractible stylus 200, according to one embodiment of the present invention. Channels 232a and 232b are rectangular channels that are molded or routed inside of an outer shaft (e.g., outer shaft 230 of FIG. 2) of stylus 200 according to one embodiment. Wedge features 235 are at the lower end of outer shaft 230 in one embodiment of the present invention. Raised features 340 on indexer 245 are shown in positions 340a, 340b, 340c, 340d and 340e to illustrate the operation of the expandable and contractible functions of stylus 200, in accordance with one embodiment.

FIG. 6 is diagram of a process 600 of expanding and contracting stylus 200 according to one embodiment of the present invention. FIG. 6 will be discussed in concert with FIG. 5 and also with reference to FIGS. 2 and 3 to explain the operation of stylus 200.

In step 610, the process 600 begins with the indexer and its raised features at position 340a, at the top of channel 232a within outer shaft 230. Although specific steps are disclosed in process 600, such steps are exemplary. That is, the present invention may be well suited to performing various other steps or variations of the steps recited in FIG. 6.

At step 620 of process 600, according to one embodiment, a user presses down on quill 210 that, in turn, presses down on inner shaft 240 and indexer 245, causing raised features 340 of indexer 245 to slide down channels 232a and 232b of outer shaft 230 in the direction shown by arrow 510. At this point, stylus 200 is in the depressed position as illustrated in FIG. 4B.

At step 630 of FIG. 6, according to one embodiment, the raised feature 340 contacts wedge 250 and rotates indexer so that feature 340 resides in position 340b. Next, as stated in step 640, the user releases quill 210 and main spring 270 exerts an upward force in the direction of arrow 520, causing indexer 245 to rotate and capturing feature 340 in position 340c in wedge shaped feature 235 at the bottom of outer shaft 230. At this point stylus 200 is in a contracted position as shown in FIG. 4A. Stylus 200 may be inverted or held in any orientation in space in this contracted position and quill 210 will remain contracted.

At step 650 of process 600, the user presses down on quill 210 once more and wedge 250 causes indexer 245 to rotate in the direction of arrow 530 so that raised feature 340 assumes position 340d. At this point, stylus is once again in a depressed position as illustrated by FIG. 4B.

At step 660, the user releases quill 210 and the pressure from spring 270 causes feature 340 to encounter a wedge-shaped feature 235 at the end of outer shaft 230, according to one embodiment. Feature 340 moves along the edge of the wedge-shaped feature and, in turn, causes indexer 245 to rotate in the direction of arrow 540. Raised feature 340 enters channel 232b, and, with the force of spring 270, travels to the top of channel 232b, thus pushing out inner shaft 240 and expanding stylus 200.

Although outer shaft 230 is shown to have two channels, 232a and 232b, it should be understood that there may be two, three, four, or any number of evenly spaced channels to correspond with the number of raised features 340 on indexer 245.

Figure 7:
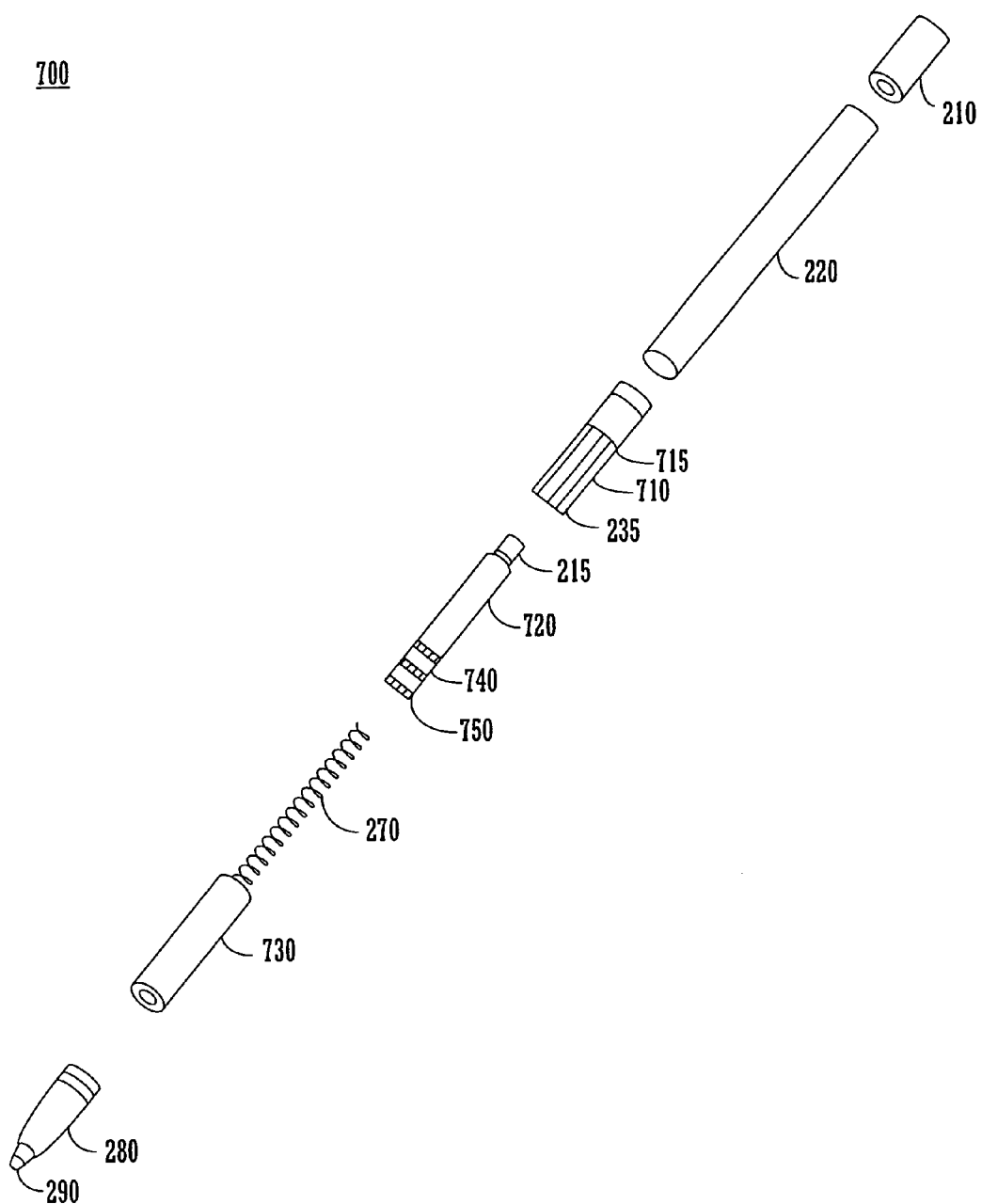
FIG. 7 is an exploded view of an expandable and contractible stylus in accordance with one embodiment of the present invention.

FIG. 7 is an exploded view of an expandable and contractible stylus 700 in accordance with one embodiment of the present invention. Plunger—style quill 210 may be constructed of a molded plastic or a metal or any material that would be appropriate for affixing to a shaft. In one embodiment, plunger 210 is pressed onto boss 215 at the end of inner shaft 720 or, in another embodiment, plunger 210 is threaded and screwed onto boss 215.

Outer tube 220 is the main body of stylus 700 according to one embodiment. In one embodiment, outer tube 220 is machined from a metal such as stainless steel, or, according to another embodiment, outer tube 220 is molded from a synthetic material such as plastic or nylon. It should be appreciated that outer tube 220 may be constructed of any material that lends itself to forming a tube of appropriate size and shape for stylus 700. Outer tube 220, according to one embodiment, has a threaded end for receiving removable tip housing 280. In another embodiment, tip housing 280 is swaged onto outer tube 220. In one embodiment, tip housing 280 is molded or milled as an integral part of outer tube 220.

Still referring to FIG. 7, outer shaft 710 is a tube that fits over an inner shaft and contains channels 715 that a raised feature on an indexer 740 follows to achieve an expanded position of stylus 700. The end of outer shaft 710 that houses the opening to channels 715 has wedge-shaped features 235 between the channels that work in concert with a spring 270 and a wedge 750 for locking stylus 700 into a contracted position, according to one embodiment of the present invention.

Figure 8:
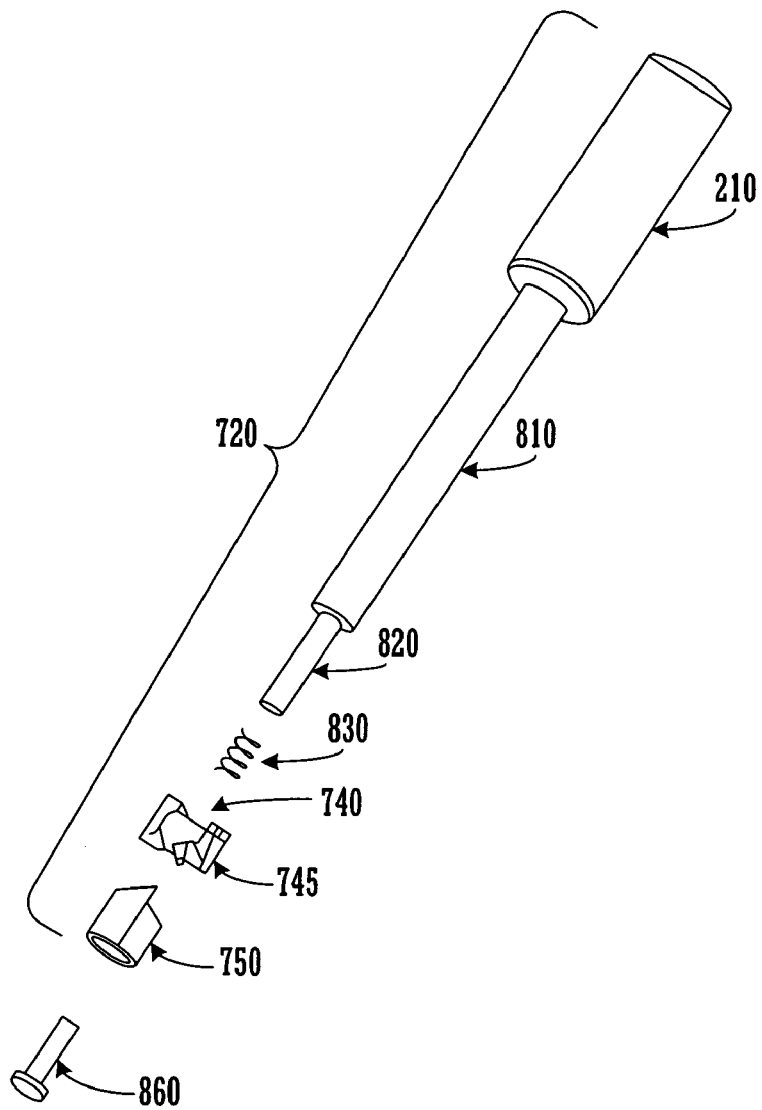
FIG. 8 is an exploded view of an innershaft and plunger of an expandable and contractible stylus according to one embodiment of the present invention.

Inner shaft 720 of stylus 700, shown in detail in FIG. 8, houses rotating indexer 740 that, in concert with the outer shaft 710, spring 270 and wedge 750, functions to cause stylus 700 to expand and contract, according to one embodiment.

Wedge 750 is a feature that rotates on the inner shaft assembly 720, according to one embodiment of the present invention. Wedge 750 has wedge-shaped edges that work in concert with the force of spring 270, wedge-shaped features 235 of outer shaft 710 and rotating indexer 740 to expand and contract stylus 700.

Spring tube 730 of stylus 700 in FIG. 7 functions, in one embodiment, to contain main spring 270. In one embodiment of the present invention, main spring 270 exerts a force that locks a protruding feature on indexer 740 into a position with respect to outer shaft 710 so as to maintain stylus 700 in an expanded or contracted position.

Still referring to FIG. 7, tip housing 280 contains tip 290, a smooth surface that functions to contact a touchscreen or digitizing tablet of a handheld device for the purpose of interfacing with the device. Tip housing 280 may also house a pen tip with ink cartridge that may allow stylus 700 to alternate between a stylus function and a pen function.

FIG. 8 is an exploded view 800 of an inner shaft 720 and plunger-type quill 210 of expandable and contractible stylus 700, according to one embodiment of the present invention. Plunger-type quill 210 fits onto one end of inner shaft 720. Quill 210 is joined to inner shaft 720 by a force fit, according to one embodiment. According to another embodiment, quill 210 and the end of inner shaft 720 are threaded so that quill 210 screws onto inner shaft 720.

Inner shaft 720 has a main body 810 and a lower boss 820 onto which a secondary spring 830, indexer 740 and wedge 750 fit, in accordance with one embodiment of the present invention. Secondary spring 830, indexer 740 and wedge 750 are held on inner shaft 720 by a retaining device. In one embodiment, the retaining device is retaining screw 860. In another embodiment, the retaining device is a retaining ring. Indexer 740 and wedge 750 can rotate freely around inner shaft 720 when retaining device 860 is in place and there is no main spring force applied. In order for wedge 750 to turn relative to indexer 740, clearance is left on lower boss 820. Secondary spring 830 takes up this clearance in the contracted and expanded positions.

Still referring to FIG. 8, indexer 740 has a number of evenly spaced raised features 745 that are designed, according to one embodiment, to slide into channels inside outer shaft 710 when the indexer 740 is positioned for expanding stylus 200. Raised features 745 are designed to be captured by wedge feature 750 when in a contracted position, according to one embodiment. In one embodiment, raised features 745 are triangular in shape. These features can, however, be of any design that would slide into channels 715 in outer shaft 710 for expanding stylus 700 and be captured by features in wedge 750 when stylus 700 is contracted.

FIGS. 9A, 9B, 9C and 9D will be discussed below in concert with FIG. 10 and with reference to FIGS. 7 and 8. In FIGS. 9A, 9B, 9C and 9D, the outer tubes have been removed to illustrate one embodiment of the mechanism of stylus 700 at its critical points.

Figure 9A:
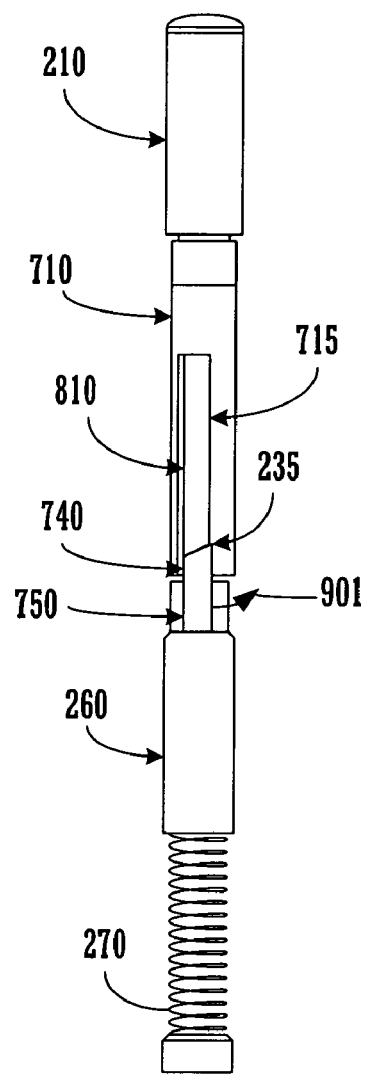
FIG. 9A illustrates an expandable and contractible stylus in a depressed position in transit from an expanded to a contracted position, according to one embodiment of the present invention.
Figure 9B:
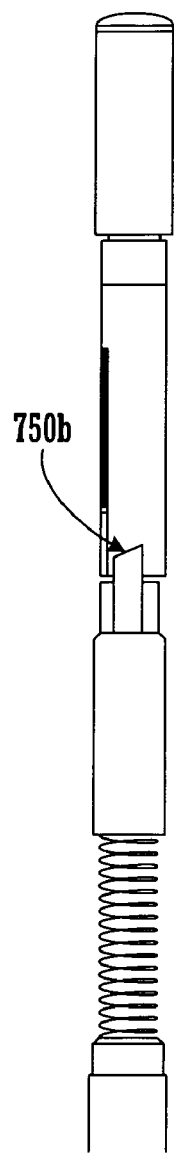
FIG. 9B is an illustration of an expandable and contractible stylus in a contracted position, according to one embodiment of the present invention.
Figure 9C:
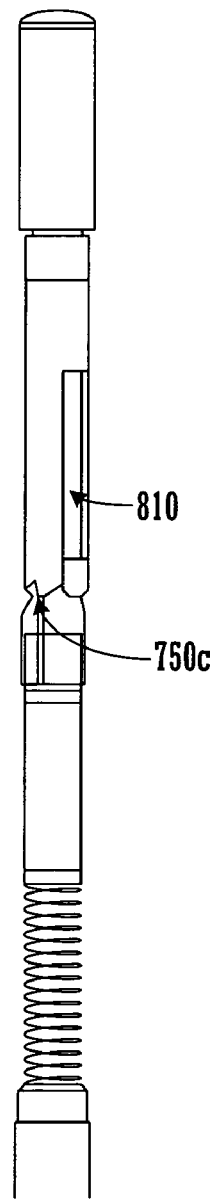
FIG. 9C is an illustration of an expandable and contractible stylus in a depressed position in transit from a contracted to an expanded position, according to one embodiment of the present invention.
Figure 9D:
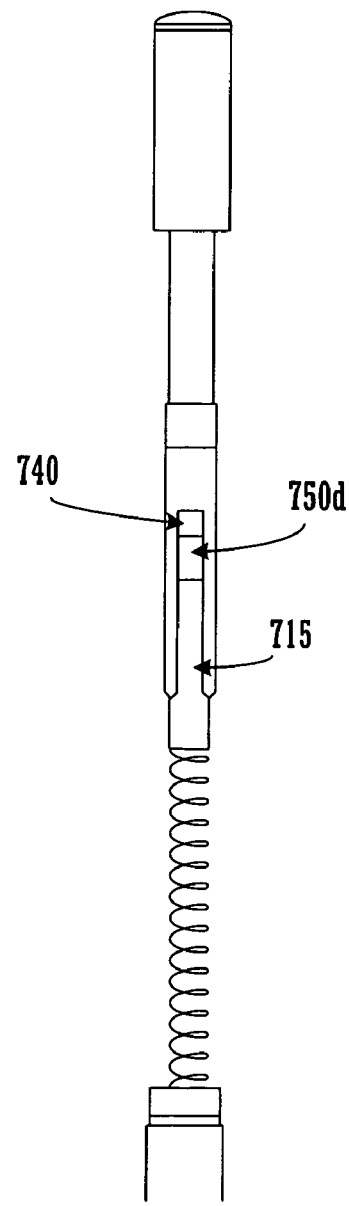
FIG. 9D illustrates an expandable and contractible stylus in an expanded position, in accordance with one embodiment of the present invention.

FIG. 9A illustrates expandable and contractible stylus 700 in a depressed position 900a in transit from an expanded to a contracted position, according to one embodiment of the present invention. FIG. 9B is an illustration of expandable and contractible stylus 700 in a contracted position 900b, according to one embodiment of the present invention. FIG. 9C is an illustration of expandable and contractible stylus 700 in a depressed position 900c in transit from a contracted to an expanded position, according to one embodiment of the present invention. FIG. 9D illustrates an expandable and contractible stylus in an expanded position 900d, in accordance with one embodiment of the present invention.

FIG. 10 is a diagram 1000 showing the process of extending and compressing stylus 700, according to one embodiment of the present invention. Although specific steps are disclosed in process 1000, such steps are exemplary. That is, the present invention may be well suited to performing various other steps or variations of the steps recited in FIG. 10.

Beginning with stylus 700 in an extended position, at step 1010, in order to actuate stylus to a compressed position, a user exerts downward axial force on quill 210 that, in turn, creates an axial force on indexer 740.

Referring to FIGS. 9A and 10, at step 1020, indexer 740 contacts a surface of wedge 750 and the surface interface converts some of the axial force to a torque on wedge 750. The torque is opposed by a feature 235 of outer shaft 710, in accordance with one embodiment of the present invention.

At step 1030 of diagram 1000, according to one embodiment, as wedge 750 reaches the end of channel 715, under the force of raised feature 745 on indexer 740 and main spring 270, wedge 750 rotates in the direction of arrow 901 as shown in FIG. 9A.

The user releases force from quill 210 in step 1040. In one embodiment, the main spring 270 pushes wedge 750 into wedge-shaped feature 235 in outer shaft 710 where it remains captured in position 750b. In the compressed position shown in FIG. 9B, stylus 700 may be inverted or positioned in any orientation in space and quill 210 will remain in the compressed position, according to one embodiment.

Next, to actuate stylus 700 to an extended position, a user again applies force to quill 210, as stated in step 1050 of FIG. 10, until wedge 750 clears the actuation point (shown as position 750c in FIG. 9C) at the tip of wedge shaped feature 235 of outer shaft 710, according to one embodiment.

At step 1060, once wedge 750 has cleared the tip of wedge shaped feature 235, according to one embodiment, under the force of indexer 740 and main spring 270, wedge 750 rotates into the next channel 715 in outer shaft 710, assuming position 750d and expanding inner shaft 710 to extended position 900d as illustrated in FIG. 9D.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A stylus comprising:
a tube;
an outer shaft disposed within said tube and having at least one inside channel;
an inner shaft slideably disposed within said outer shaft;
an indexer rotatable coupled to said inner shaft and having a raised feature for sliding in said at least one inside channel; and
a plunger coupled to said inner shaft, wherein, in response to said plunger being depressed a first time, said inner shaft moves from a first position to a second position and said inner shaft and said plunger remain in said second position for any orientation in space until, in response to said plunger being depressed a second time, said inner shaft moves from said second position to said first position and said inner shaft and said plunger remain in said first position for any orientation in space.

2. The stylus of claim 1 further comprising:
a wedge coupled to said inner shaft;
said indexer configured to interface with said wedge so as to rotate when said plunger is depressed; and
a spring contacting said inner shaft so as to exert a force for locking said raised feature of said indexer and maintaining said inner shaft in a contracted position.

3. The stylus of claim 2 further comprising:
said outer shaft slideably coupled to said inner shaft wherein said raised feature of said indexer is configured to slide into said inside channel when aligned with said channel and acted on by said force from said spring, said force maintaining said inner shaft in an expanded position.

4. The stylus of claim 3 wherein said raised feature of said indexer is triangular in shape.

5. The stylus of claim 2 wherein, in said contracted position, said stylus is sized to fit into a stylus holder of a handheld device.

6. The stylus of claim 5 wherein said plunger being depressed with said stylus residing in said holder, causes said stylus to expand to facilitate removal of said stylus from said handheld device.

7. The stylus of claim 2 wherein said indexer is retained on said shaft by a retaining ring.

8. The stylus of claim 2 wherein said indexer is retained on said shaft by a retaining screw.

9. The stylus of claim 1 having a tip and tip housing coupled to one end of said tube, wherein said tip is a pen point with ink cartridge, and wherein said pen point is configured to emerge from said tip housing when said inner shaft is in a contracted position.

10. The stylus of claim 1 further comprising:
a first wedge coupled to said outer shaft;
a second wedge;
said indexer rotatably coupled to said inner shaft and having said raised feature, wherein said indexer is configured to interface with said second wedge so as to rotate when said plunger is depressed; and
a spring coupled to said inner shaft so as to exert a force for locking said raised feature of said indexer and maintaining said inner shaft in a contracted position.

11. The stylus of claim 10, wherein said raised feature of said indexer is configured to slide into said at least one inside channel in said outer shaft when aligned with said at least one inside channel and acted on by said force from said spring, said force maintaining said inner shaft in an expanded position.

12. The stylus of claim 11 wherein said raised feature of said indexer is triangular in shape.

13. The stylus of claim 10 wherein, in said contracted position, said stylus is sized to fit into a stylus holder of a handheld device.

14. The stylus of claim 13 wherein said plunger, being depressed with said stylus residing in said holder, causes said stylus to expand to facilitate removal of said stylus from said handheld device.

15. The stylus of claim 10 wherein said indexer is retained on said inner shaft by a retaining ring.

16. The stylus of claim 10 wherein said indexer is retained on said inner shaft by a retaining screw.

17. An expandable and contractible stylus comprising:
an outer shaft having an inside channel;
an inner shaft slideably disposed within said outer shaft;
a plunger coupled to said inner shaft;
a first wedge coupled to said outer shaft;
an indexer rotatably coupled to said inner shaft and having a raised feature, wherein said indexer is configured to interface with a second wedge so as to rotate when said plunger is depressed; and
a spring disposed within said second wedge, said spring coupled to said inner shaft so as to exert a force for locking said indexer so that said inner shaft and said plunger maintain their position for any orientation in space.

18. The stylus of claim 17 wherein said spring and said first wedge maintain said inner shaft in a contracted position when said raised feature is not aligned with said inside channel.

19. The stylus of claim 18 wherein, in said contracted position, said stylus is sized to fit into a stylus holder of a handheld device.

20. The stylus of claim 19 wherein depressing said plunger of said stylus while said stylus resides in said holder causes said stylus to expand, thus facilitating removal of said stylus from said device.

21. The stylus of claim 18 wherein said spring and said channel maintain said inner shaft in an expanded position when said raised feature is aligned with said inside channel.

22. The stylus of claim 21 further comprising:
an outer tube disposed around said outer shaft; and
a tip housing removeably coupled to said outer tube.

23. The stylus of claim 17 wherein said second wedge comprises wedge-shaped features at an end of a tube, said tube for containing a spacer and said spring.

24. The stylus of claim 17 wherein said raised feature of said indexer is triangular in shape.

25. The stylus of claim 17 wherein said indexer is retained on said inner shaft by a retaining ring.

26. The stylus of claim 17 wherein said indexer is retained on said inner shaft by a retaining screw.

27. An adjustable-length stylus, comprising:
an outer shaft having an inside channel;
a first wedge disposed on said outer shaft;
an inner shaft slidably coupled to said outer shaft;
a quill coupled to said inner shaft;
an indexer rotatably coupled to said inner shaft and having a plurality of raised features, wherein said indexer is configured to interface with a second wedge so as to rotate when said quill is depressed; and
a spring disposed within a tube having said second wedge at an end, said spring coupled to said inner shaft so as to exert a force for locking said indexer so that said inner shaft, along with said quill, maintains its position for any orientation in space.

28. The adjustable-length stylus of claim 27 further comprising:
An outer tube disposed around said outer shaft; and
a tip housing removeably coupled to said outer tube.

29. The adjustable-length stylus of claim 28 wherein said tip is a pen point with ink cartridge, and wherein said pen point is configured to emerge from said housing when said inner shaft is in said contracted position.

30. The adjustable-length stylus of claim 27 wherein said plurality of raised features of said indexer are triangular in shape.

31. The adjustable-length stylus of claim 27 wherein, in a contracted position, said stylus is sized to fit into a stylus holder of a handheld device.

32. The adjustable-length stylus of claim 31 wherein depressing said quill of said stylus while said stylus resides in said holder causes said stylus to expand, thus facilitating removal of said stylus from said device.

33. The adjustable-length stylus of claim 27 wherein said indexer is retained on said inner shaft by a retaining ring.

34. The adjustable-length stylus of claim 27 wherein said indexer is retained on said inner shaft by a retaining screw.

* * * * *